Dec. 9, 1930.  E. L. McOSKER  1,784,193
SPRING TOOTH CULTIVATOR
Filed Dec. 27, 1928  2 Sheets-Sheet 1

Inventor
E. L. McOsker
By Watson E. Coleman
Attorney

Dec. 9, 1930.  E. L. McOSKER  1,784,193
SPRING TOOTH CULTIVATOR
Filed Dec. 27, 1928    2 Sheets-Sheet 2
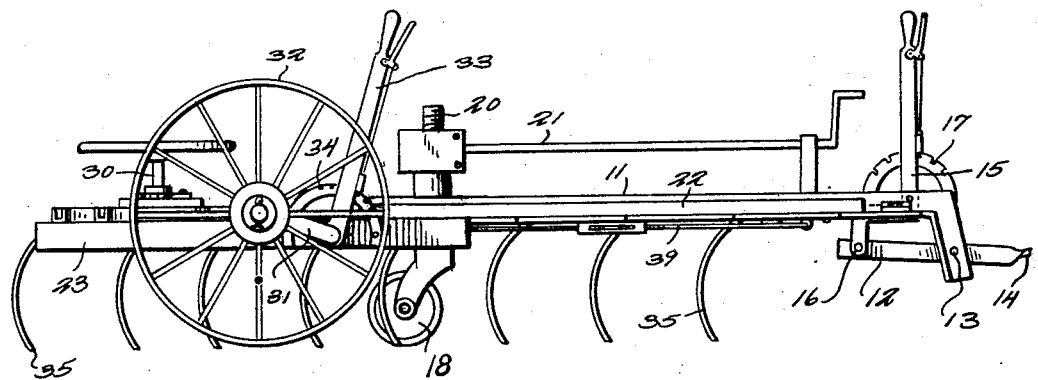
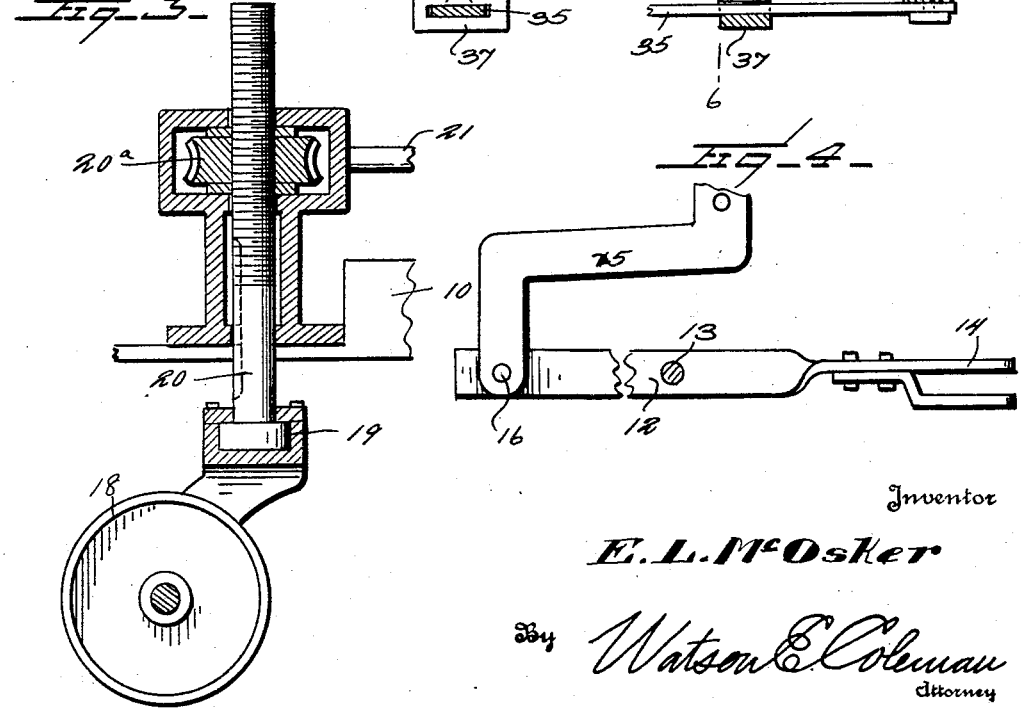
Inventor
E. L. McOsker
By Watson E. Coleman
Attorney Patented Dec. 9, 1930

1,784,193

UNITED STATES PATENT OFFICE

ERNEST LOUIS McOSKER, OF PRESTON, KANSAS

SPRING-TOOTH CULTIVATOR

Application filed December 27, 1928. Serial No. 328,826.

This invention relates to spring tooth harrows or cultivators and particularly those in which the harrow teeth are mounted upon laterally projecting wings pivotally connected to each other at the forward ends of the implement so that these wings may be shifted into or out of a greater or less degree of convergence so as to narrow the harrow or cultivator for certain work or to permit the harrow to pass through gateways or over roads, etc. Harrows of this kind are used not only to pulverize the ground after it has been plowed but in this class of harrows the spring teeth, which are long, dig down in the ground as it drags along and carries to the top or the surface all foreign matter such as grass and weeds. The grass and weeds thus carried to the surface catch the snow and hold the moisture during the winter and keep the ground from blowing during dry spells.

One of the objects of my invention is to provide a harrow or cultivator of the type described having the two angularly disposed and relatively adjustable wings in which these wings are hingedly engaged with each other so as to permit one wing to drop down into a depression while the other may be passing over an elevation in the ground so that thus the wings of the harrow will not pass over depressions in the ground without working the ground, and thus doing away with the harrow skipping some places and working too deeply in others.

A further object is to provide a cultivator of the character described having light draft and which is so constructed that it can be folded into a narrow space and whose wings can be so adjusted that the harrow teeth while having a constant clearance, may be adjustably spaced from each other so that the harrow may be used either for very fine work or for use on stubble ground where it is necessary that the teeth shall clear the trash often found thereon.

A further object is to provide means whereby the front or rear end of the medial frame of the harrow may be raised or lowered independently of each other and whereby the wings of the harrow at their outer ends may be raised or lowered without interfering at all with the free independent movement of the two wings with relation to each other.

Another object is to provide means whereby the front end of the harrow may be connected to a tractor hitch and to provide a lever forming part of this connection so arranged that the lift is directly on the frame of the machine making the lever very easily handled.

Other objects will appear in the course of the following description.

My invention is illustrated in the accompanying drawings, wherein:—

Figure 2 is a side elevation thereof;

Figure 3 is a vertical sectional view of the rear supporting wheel and the means for raising or lowering the machine thereon.

Figure 4 is a fragmentary elevation of the connection to the tractor;

Figure 5 is a section on the line 5—5 of Figure 1;

Figure 6 is a fragmentary cross section on the line 6—6 of Figure 5.

Figure 1:
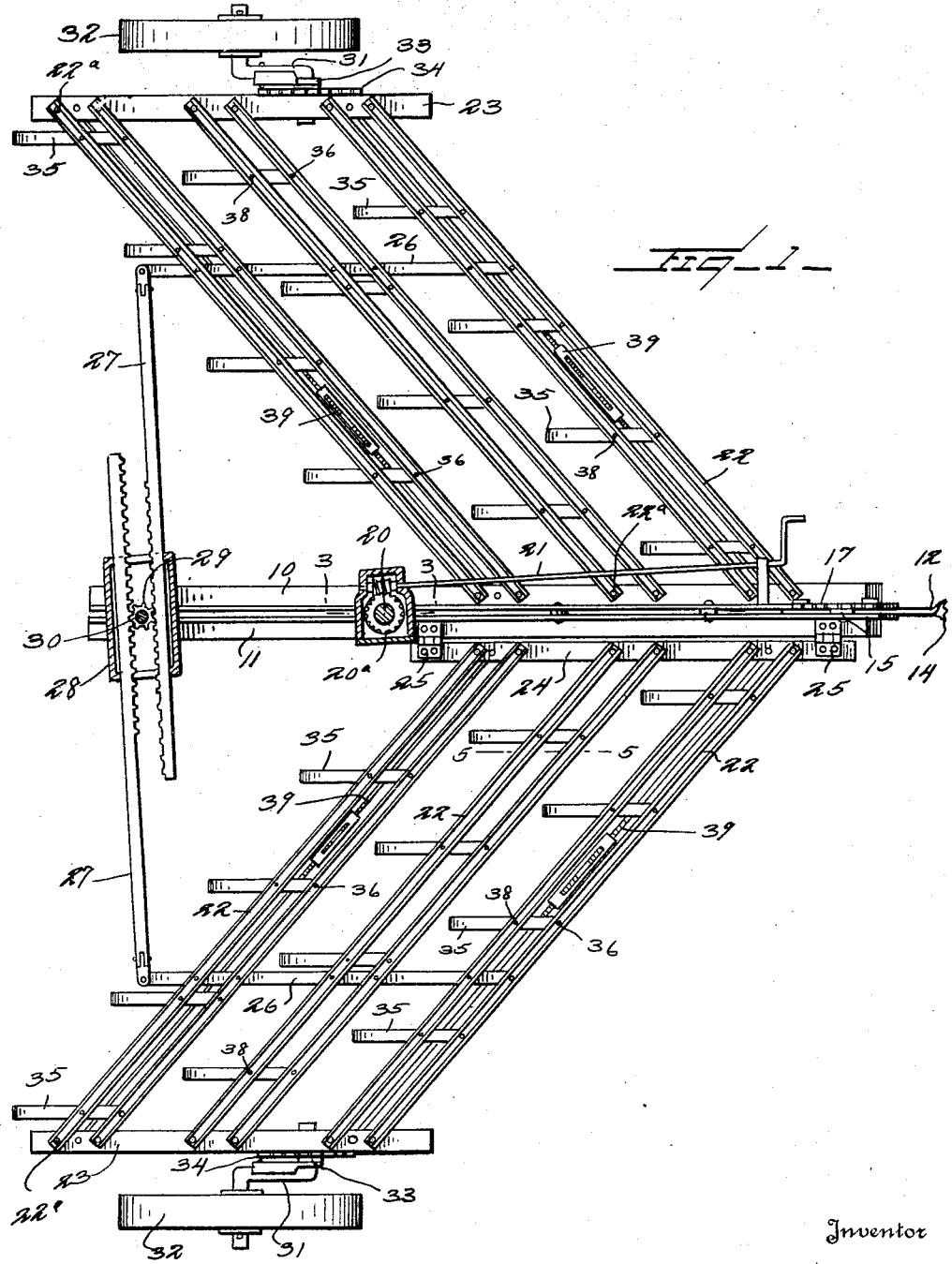
Figure 1 is a top plan view of the spring tooth harrow or cultivator constructed in accordance with my invention.

Referring to these drawings, it will be seen that the central frame of the harrow consists of two angle irons 10 and 11 disposed in parallel relation to each other and joined in any suitable manner as by bolts passing through the two vertical flanges of these angle irons. The forward ends of the angle irons are extended downward. Between the angle irons there is disposed the hitch iron 12 whose forward end extends between the downwardly extended forward ends of the angle irons 10 and 11 and is provided with the clevis 14 for receiving the tractor hitch. A bell crank lever 15 whose rear end is angular and pivoted at 16 to the rear end of the hitch iron 12 operates to raise or lower the frame. The handle of the lever 15 passes over an arcuate rack 17 with which it is engaged in any suitable manner. The rear end of the medial frame formed by the irons 10 and 11 supports a caster wheel 18 which is preferably vertically adjustable.

To this end the caster wheel I have illustrated as being mounted between forks which are connected at their upper ends to a swivel element 19 swiveled upon the lower end of a vertical post 20. This post 20 is formed with screw-threads but is held against rotation by any suitable means as for instance by being splined to the housing which encloses the post 20 as shown in Figure 3. Mounted in suitable bearings carried upon this medial frame or in any other suitable manner is a longitudinally extending shaft 21 having at its rear end a worm engaging with a nut 20ª engaging said screw-threads, this shaft having a crank handle at its forward end whereby it may be turned.

Bolted or otherwise connected to the angle iron 10 are a plurality of pairs of parallel frame bars 22, the bolts 22ª holding the frame bars to the angle iron 10 constituting pivot bolts. The outer ends of these frame bars 22 are pivotally connected to a longitudinal lateral frame bar 23. The other wing of the harrow is also formed of pairs of bars 22, these being pivoted at their inner ends to a longitudinally extending bar 24 which is hinged at 25 to the angle iron 11. The outer ends of the bars 22 on the right hand side of the machine are also all pivotally connected to a longitudinally extending frame bar 23 as previously described on the other wing. It will thus be seen that each wing consists of a frame, having the general form of a parallelogram which includes longitudinally extending parallel members and transversely extending parallel members pivoted to the longitudinal members and thus these wings may be turned from a position nearly or quite at right angles to said line of draft. Thus these wings may be turned from a position nearly in alignment with each other to a position at an acute angle to each other.

The frame bars 22 of each wing are all pivotally connected to a longitudinal frame bar 26 and the rear ends of these bars 26 are pivotally connected to transverse adjusting racks 27 which extend through guides 28 mounted upon the angle iron 10, the racks in turn being engaged by a gear wheel 29 mounted upon a vertical shaft 30 having a hand wheel whereby the shaft may be operated. The shaft 30 is provided with any means whereby it may be locked against rotation, as for instance the pawl and ratchet mechanism which is shown in Figure 2, the ratchet being designated 30ª. Of course, in order to permit the wings to move vertically independently of each other, the connection of the racks 27 to the frame bars 26 must be a flexible connection and the guides 28 must be slotted so as to permit the racks 27 to tilt with relation to each other as illustrated or the rack bars 27 are formed of a plurality of pivotally connected sections.

Mounted upon the end frame bar 22 of each wing is a cranked axle 31 carrying a wheel 32 and shiftable by means of a lever 33 pivoted upon the medial portion of the axle 31 and extending rearward and engaging the crank of the axle. This lever 33 operates over a segment 34 and each lever is provided with a locking device to engage the rack at any desired point. By swinging both of these levers in one direction, the rear portion of the cultivator must be raised as an entirety or by swinging the levers in the other direction may be lowered as an entirety or one side of the cultivator raised or lowered as desired so as to bring the two wings of the cultivator normally in a horizontal plane, the lateral wheels 32 being adjusted, of course, into conformity with the adjustment of the wheel 18.

Mounted upon each pair of frame bars 22 are the harrow teeth 35. Each of these teeth at its forward end is pivotally engaged as by a bolt 36 with the forward frame bar of a pair.

The rear portion of each tooth, however, is not pivotally connected to the rear frame bar of the pair, but passes through guides 37. These guides 37 are pivotally connected to the frame bar by means of a bolt 38 as shown in detail in Figure 5. This construction makes the teeth more flexible and does not tend to render the frame too rigid. Preferably, the bolts which connect the longitudinal bar 26 to the frame bars 22 and the bolts which connect the teeth 35 to the frame bars pass through steel ferrules 40 as shown in Figure 5. This makes a sturdy and strong joint and yet permits the frame to be readily adjusted.

Truss rods 39 run parallel with the frame bars 22 and are connected at their ends to the angle irons (10 or 11) and the end members 23, these truss rods being preferably provided with turn buckles whereby they may be tightened up from time to time.

It will be seen that I have provided a main frame which can accommodate the twenty-six teeth spaced approximately twelve inches apart when the cultivator is swung out, that is, when the wings are swung into a position of approximate alinement. Under these circumstances the cultivator has a spread of twenty-two feet. When the cultivator wings are swung inward to their greatest extent so that the width of the cultivator is reduced to its narrowest, the paths of travel of the teeth will be spaced apart only about two inches. This width is only practical for very fine work, or for passing through a narrow space or for cultivation of orchards. At its greatest width of twenty-two feet, the lateral space between teeth is twelve inches. The clearance of the teeth set diagonally across the frame is twenty-five inches. Thus ample space is provided for clearing trash which is often encountered on stubble ground.

The standard width of cut for the modern farm implement, which is powered by a tractor of the 15–30 type, is sixteen feet. When set to this width my improved cultivator has the paths of these teeth set six inches apart while the diagonal clearance space is twenty-five inches as before stated.

With my machine, the teeth are automatically swung into the line of draft under all circumstances of operation and no teeth have to be added or taken off when the width of the machine is changed. Changing the width of the machine one foot changes the lateral distance between teeth one inch. By adjusting the three elevating wheels 18 and 32, the teeth can be adjusted so as to cut at a uniform depth at all times. By placing the hitch or point of pull at the apex, that is, opposite the front center of the machine, at least 75% of the draft stress is lengthwise of each half of the main frame instead of across the frame. Inasmuch as the frame is flexibly jointed, on uneven ground the frame will permit a dip or a rise on the ends of the frame, that is, of one wing relative to the other so that the teeth will always cut at a uniform depth even though the center of the machine or either end or both be lower than a general level. All positions of the frame, whether extended to its maximum width of twenty-two feet or narrowed to its narrowest width of twelve feet, still leaves the teeth a clearance of twenty-five inches between each tooth bar.

While I have illustrated certain details of construction and arrangement of parts I do not wish to be limited to these as it is obvious that many minor changes might be made without departing from the spirit of the invention as defined in the appended claims.

I claim:—

1. An implement of the character described, comprising a medially disposed frame having means at its forward end whereby it may be connected to a draft hitch, and having a vertically adjustable wheel at its rear end, wings disposed on each side of the medial frame, each of said wings comprising a plurality of parallel pairs of frame bars and longitudinal bars pivoted thereto, one of said wings being hingedly connected to the medial frame to thereby permit the wings to move vertically independently of each other, vertically adjustable supporting wheels carried on the outer ends of the wings, means mounted at the forward end of the medially disposed frame whereby the forward end of the frame may be raised or lowered, and teeth disposed in staggered relation to each other and swingingly connected to the pairs of frame bars.

2. A harrow of the character described comprising a medially disposed frame formed of two longitudinally extending connection irons, a vertically adjustable tractor hitch carried by the forward ends of said irons, a vertically adjustable caster wheel supporting the rear ends of the irons, lateral wings each consisting of a plurality of pairs of parallel frame bars, the frame bars at their outer ends being pivotally connected to longitudinal frame bars, the inner ends of the first-named frame bars of one wing being pivotally connected to the medial frame and the inner ends of the frame bars of the other wing being pivotally and hingedly connected operatively to the medial frame, vertically adjustable wheels carried on the ends of said wings and independently adjustable to raise or lower the outer ends of the wings, and means for spreading or contracting said wings including two rack bars operatively connected to the wings and an intermediate gear wheel engaging said rack bars.

In testimony whereof I hereunto affix my signature.

ERNEST LOUIS McOSKER.